(12) United States Patent
Arakawa et al.

(10) Patent No.: US 7,356,698 B2
(45) Date of Patent: Apr. 8, 2008

(54) DEVICE AUTHENTICATION APPARATUS AND METHOD, AND RECORDED MEDIUM ON WHICH DEVICE AUTHENTICATION PROGRAM IS RECORDED

(75) Inventors: Norio Arakawa, Tokyo (JP); Jun Miyajima, Tokyo (JP)

(73) Assignee: Advantest Corporation, Tokyo (JP)

( * ) Notice: Subject to any disclaimer, the term of this patent is extended or adjusted under 35 U.S.C. 154(b) by 681 days.

(21) Appl. No.: 10/181,372

(22) PCT Filed: Jan. 24, 2001

(86) PCT No.: PCT/JP01/00445

§ 371 (c)(1),
(2), (4) Date: Jul. 18, 2002

(87) PCT Pub. No.: WO01/55842

PCT Pub. Date: Aug. 2, 2001

(65) Prior Publication Data

US 2002/0194477 A1    Dec. 19, 2002

(30) Foreign Application Priority Data

Jan. 28, 2000    (JP) ............................. 2000-019570

(51) Int. Cl.
    *H04L 9/00*    (2006.01)
(52) U.S. Cl. .................................... 713/170
(58) Field of Classification Search ................. 713/170
    See application file for complete search history.

(56) References Cited

U.S. PATENT DOCUMENTS 4,558,176 A * 12/1985 Arnold et al. .............. 713/190
5,444,780 A   8/1995 Hartman, Jr.
5,933,497 A   8/1999 Beetcher et al.
6,002,694 A   12/1999 Yoshizawa et al.

FOREIGN PATENT DOCUMENTS

| EP | 0 531 784 A2 | 3/1993 |
|----|--------------|--------|
| EP | 0679980      | 11/1995 |
| JP | 07-244584 A  | 9/1995 |
| WO | WO 98/50861  | 11/1998 |
| WO | WO 99/26123  | 5/1999 |
| WO | WO 99/55055  | 10/1999 |
| WO | WO 00/04718  | 1/2000 |

OTHER PUBLICATIONS

Microsoft Press Computer Dictionary, 1997, Third Edition, p. 388.*

* cited by examiner

*Primary Examiner*—Kambiz Zand
*Assistant Examiner*—Jacob Lipman
(74) *Attorney, Agent, or Firm*—Greenblum & Bernstein, P.L.C.

(57) ABSTRACT

The present invention provides a device authentication unit for authenticating a computer, a measuring device or another device having a serial number or another inherent device number. A software encrypting section receives a serial number and encrypts the received serial number in the public key method with the serial number being a public key. An encrypted data transmission section transmits the encrypted serial number. A received serial number decoding section receives an encrypted serial number and decodes the encrypted serial number using a secret key corresponding to the serial number. Public key decoding by the received serial number decoding section succeeds only if a correct serial number is given. Accurate serial number inherent to the device can be acquired and device authentication can be made.

32 Claims, 4 Drawing Sheets

| ID | User name |
|---|---|
| a1×××2 | ○○○○ |
| a8×××9 | ○×○△ |
| b2×××5 | △△×× |

42

(b)

| Password | Serial number |
|---|---|
| r R 9 1 | 0 1 2 3 |
| 2 S Y 1 | 4 3 8 2 |
| 9 7 A b | 6 7 6 5 |

44

| ID | Serial number |
|---|---|
| a1×××2 | 0 1 2 3 |
| a8×××9 | 4 3 8 2 |
| b2×××5 | 6 7 6 5 |

44

(c)

| Serial number | Device name |
|---|---|
| 0 1 2 3 | T 1531 A |
| 4 3 8 2 | T 1530 B |
| 6 7 8 5 | T 1533 A |

46

(d)

| Device name | Software Name |
|---|---|
| T 1531 A | ver.1.0   ver1.1 |
| T 1530 B | ver.3.0A ver3.0B |
| T 1533 A | ver3.1   ver3.2 |

48

DEVICE AUTHENTICATION APPARATUS AND METHOD, AND RECORDED MEDIUM ON WHICH DEVICE AUTHENTICATION PROGRAM IS RECORDED

BACKGROUND OF THE INVENTION

1. Field of Invention

This invention relates to the technology for authenticating computers, measuring devices and other devices having serial numbers or other types of inherent device numbers.

2. Description of the Related Art

Various methods are used for upgrading software installed in a computer or firmware built in a measuring device.

If the software or firmware is stored in EPROM or similar devices, replacement of the corresponding part is the first method. If this method is adopted, measuring devices or the like must be collected from the user to parts replacement contractors or manufacturer because parts replacement is hard for users. Therefore the labor cost for upgrading is large.

Next, the floppy disk or the like can be used for upgrading. That is, software or firmware is stored in a nonvolatile memory inside the measuring device or the like. A recording medium such as a floppy disk on which upgrading software is recorded is handed over to the user. As a last step, the user uses the recording medium such as a floppy disk to upgrade software or the like.

This method contains the following disadvantage. Even if upgrading software includes an onerous part, there is no method to prevent the upgrading floppy disk obtained by a certain user from being used by another user for illegal upgrading. Next, if two or more kinds of upgrading software are recorded in the upgrading floppy disk according to the internal configuration of the same model of the measuring device or the like, the user may execute a wrong kind of upgrading software.

These disadvantages are common for download of upgrading software from an external computer through an interface and download via Internet.

These disadvantages originate from lack of authentication of the measuring device or the like to be upgraded.

That is, if the upgraded measuring device or the like is known to the manufacturer or the like, the user having used the upgrading floppy disk, even if the same floppy disk is used by two or more users, can be billed later.

Moreover, if the upgraded measuring device or the like is known to the manufacturer or the like, an upgrading program suitable for the model of the measuring device can be provided. Thus wrong upgrading can be avoided.

SUMMARY OF INVENTION

However, there is not suitable technology for authenticating the measuring device or the like to be upgraded. The task of this invention is to provide a device authenticating unit or the like for authentication of a computer, measuring device or the like having a serial number or other types of inherent device numbers.

According to the present invention, a device authentication unit for authenticating a device having an inherent device number includes an encrypting unit for receiving the device number and encrypts the received device number in the public key method with the device number being a public key; an encrypted data transmission unit for transmitting the encrypted device number; and a received device number decoding unit for receiving the encrypted device number and decoding the encrypted device number by using a secret key corresponding to the device number, which is the public key.

A "device" means a unit such as a computer and a measuring device which operates on built-in software. A "device number" means a number such as the serial number.

With a device authentication unit configured in the above method, an encrypting unit encrypts the device number in the public key method with the device number inherent to the device being a public key, and a received device number decoding unit decodes the device number, using a secret key corresponding to the public key. If a correct device number inherent to the device is given, decoding succeeds. On contrary, if a wrong device number inherent to the device is given, or if a device number for another device is given intentionally, decoding fails. Therefore decoding succeeds only if the correct device number is given. Therefore an accurate device number inherent to the device is obtained and authentication of the device is achieved.

According to the present invention, a device authentication unit for authenticating the device having an inherent device number includes an encrypting unit for receiving the device number and encrypting the received device number in the public key method with the device number being a public key; and an encrypted data transmission unit for transmitting the encrypted device number.

According to the present invention, a device authentication unit for authenticating the device having an inherent device number includes a received device number decoding unit for receiving the encrypted device number in the public key method with the device number being a public key, and encrypting the encrypted device number using the secret key corresponding to the device number, which is the public key.

According to the present invention, a device authentication unit displays an error if the received device number decoding unit cannot decode the encrypted device number.

According to the present invention, a device authentication unit includes a correspondence software recording unit for recording correspondence between the device number and the name of the software suitable for the device; and a software recording unit for recording software corresponding to the software name; wherein the encrypting unit reads the software corresponding to the software name, from the software recording unit; and the encrypted data transmission unit transmits the encrypted device number and the read software.

The "software name" mentioned here means a pointer indicating software. Software includes data as well as the program.

Because the device number identifies the device, the name of the software suitable for the device is known. Accordingly, the software is transmitted for upgrading. As a result, wrong upgrading is avoided.

According to the present invention, a device authentication unit includes a correspondence software recording unit for recording correspondence between the device number and the name of the software suitable for the device; and a software recording unit for recording software corresponding to the software name; wherein the encrypting unit reads the software corresponding the software name from the software recording unit, and encrypts the software with the device number being a public key; and the encrypted data transmission unit transmits the encrypted device number and the encrypted software.

Capability of prevention of wrong upgrading is similar to the invention. Moreover, because the encrypting unit encrypts the software, which is read from a software recording unit, according to the public key method, inadvertent analysis of the software is avoided. An upgrading floppy disk leaves possibility of inadvertent analysis of the contents of the floppy disk. This problem can be avoided.

According to the present invention, a device authentication unit described in includes a correspondence software unit for recording correspondence between the device number and the name of the software suitable for the device; a software presenting unit for reading and presenting the name of the software suitable for the device from the correspondence software recording unit, using the received said device number; a software designation unit for accepting a designation of the software necessary for the device from among the software; a software selecting unit for transmitting the software name to the encrypting unit upon the designation; and a software recording unit for recording software corresponding to the software name; wherein the encrypting unit reads the software corresponding to the software name designated with the software recording unit; and the encrypted data transmission unit transmits the encrypted device number and the read software.

Because a software presenting unit reads the name of the software suitable for the device and presents it to the user and the user can designate the necessary software, using a software designation unit, the truly necessary software can be designated.

According to the present invention, a device authentication unit includes a correspondence software recording unit for recording correspondence between the device number and the name of the software suitable for the device; a software presenting unit for reading and presenting the name of the software suitable for the device from the correspondence software recording unit, using the received device number; a software designation unit for accepting a designation of the software necessary for the device, from the presented software; a software selecting unit for sending the software name to the encrypting unit upon the designation; and a software recording unit for recording the software corresponding to the software name; wherein the encrypting unit reads the software, which corresponds to the software designated by the software recording unit, and encrypts the software in the public key method with the device number being a public key; and the encrypted data transmission unit transmits the encrypted device number and the encrypted software.

The present invention is a device authentication unit, wherein the correspondence software recording unit includes a device information database which records correspondence between the device number and the device name of the device; and a software database which records the device name of the device and the name of the software suitable for the device.

According to the present invention, a device authentication unit includes a device number recording unit for recording the device number; and a device number verifying unit for verifying the device number decoded by the received device number decoding unit with the device number recorded by the device number recording unit.

Because the device number verifying unit is used to verify the device number decoded by the received device number decoding unit with the device number recorded by a device number recording unit, illegal use of the device number of another device is further avoided.

The present invention is a device authentication unit, wherein the device number recording unit includes an encrypted device number recording unit for recording the encrypted device number; and a device number decoding unit for decoding the encrypted device number.

Because the device number is encrypted by an encrypted device number recording unit, modification is difficult, resulting in further prevention of illegal use of the device number of another device.

The present invention is a device authentication unit which displays an error if verification by the device number verifying unit results in disagreement.

According to the present invention, a device authentication unit includes a login request receiving unit for receiving and verifying a user ID and a password; a device number database, which records correspondence between the password and the device number; and a device number acquisition unit for acquiring and transmitting the device number from the device number database upon agreement of the result of verification by the login request receiving unit, using the password.

Because the user ID and password are used for transmission of the device number, illegal use of the device number of another device is further avoided.

According to the present invention, a device authentication unit includes a logic request receiving unit for receiving and verifying a user ID and a password; a device number database, which records correspondence between the ID and the device number; and a device number acquisition unit for acquiring and transmitting from the device number database upon agreement of the result of verification by the login request receiving unit, using the ID.

According to the present invention, a device authentication method for authenticating the device having an inherent device number includes an encrypting step for receiving the device number and encrypting the received device number in the public key method with the device number being a public key; and an encrypted data transmission step for transmitting the encrypted device number.

According to the present invention, a device authentication method for authenticating the device having an inherent device number includes a received device number decoding step for receiving the encrypted device number in the public key method with the device number being a public key, and encrypting the encrypted device number using the secret key corresponding to the device number, which is the public key.

The present invention is a computer-readable medium having a program of instructions for execution by the computer to perform a device authentication processing for authenticating the device having an inherent device number, the device authentication processing including an encrypting processing for receiving the device number and encrypting the received device number in the public key method with the device number being a public key; and an encrypted data transmission processing for transmitting the encrypted device number.

The present invention is a computer-readable medium having a program of instructions for execution by the computer to perform a device authentication processing for authenticating the device having an inherent device number, the device authentication processing including a received device number decoding processing for receiving the encrypted device number in the public key method with the device number being a public key, and encrypting the encrypted device number using the secret key corresponding to the device number, which is the public key.

BRIEF DESCRIPTION OF THE DRAWINGS

FIGS. 3(a), 3(b), 3(c) and 3(d) show the contents of each database recorded in the memory 40.

DESCRIPTION OF THE PREFERRED EMBODIMENTS

The best mode for carrying out this invention is described below in reference to drawings.

Figure 1:
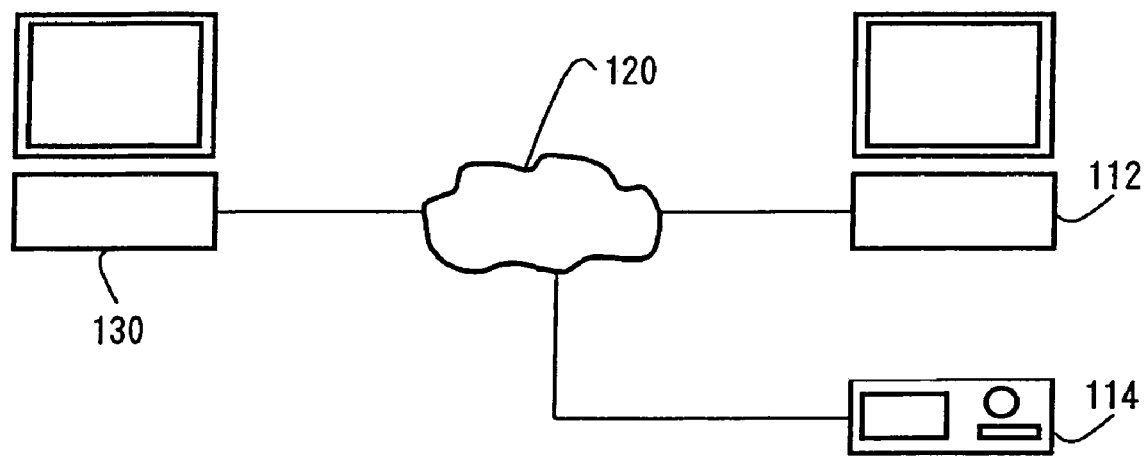
FIG. 1 shows outline configuration of the best mode for carrying out this invention.

FIG. 1 shows an outline configuration of the mode for carrying out this invention. As shown in FIG. 1, a distributing server 130 is connected via Internet 120 with a PC 112 and a measuring device 114. The PC 112 and the measuring device 114 include software and firmware to be upgraded. The PC 112 and the measuring device 114 have inherent serial numbers. The distributing server 130 includes software (program and data) used for upgrading.

Figure 2:
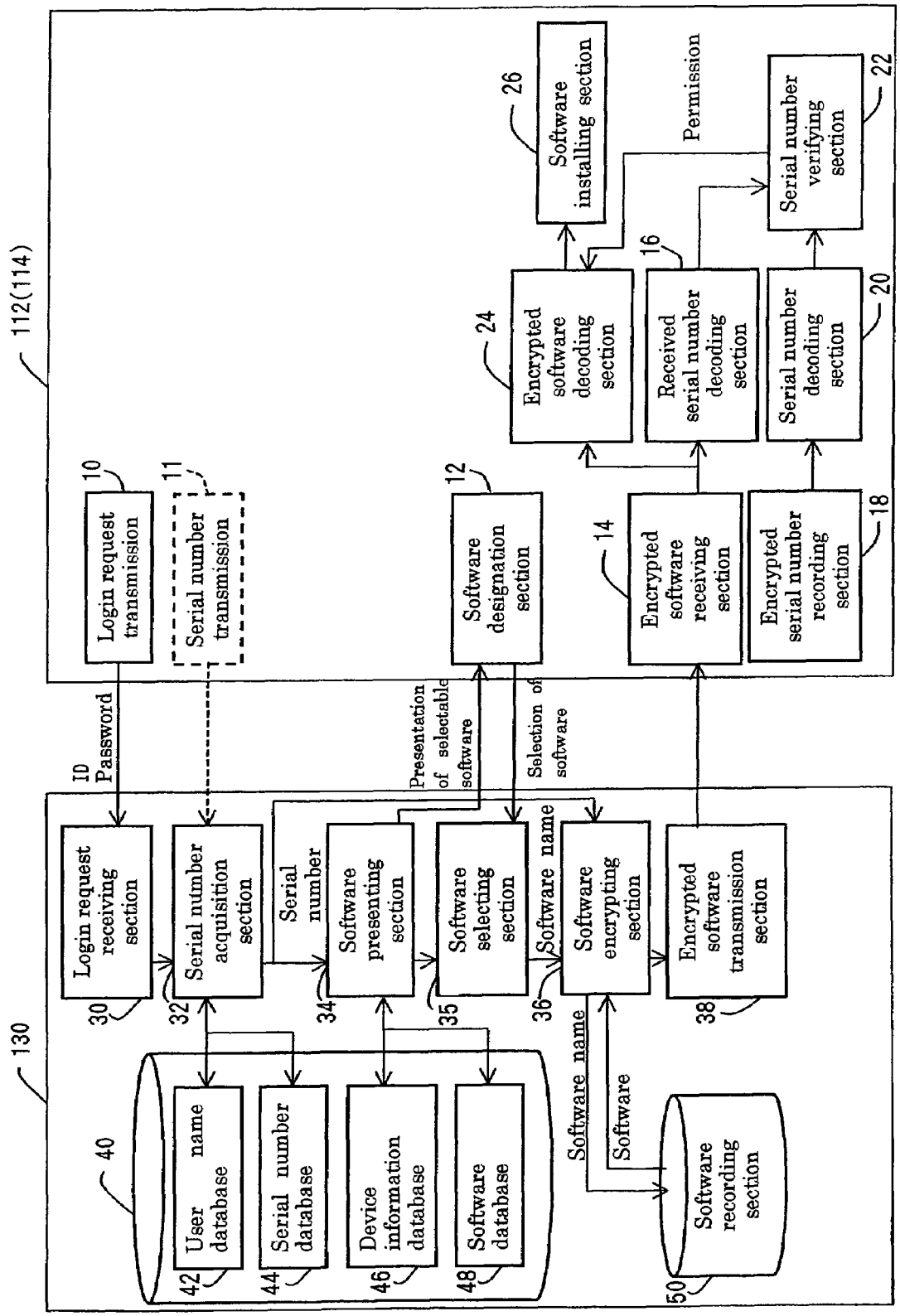
FIG. 2 is a block diagram showing detail configuration of the best mode for carrying out this invention.

FIG. 2 indicates the detail configuration of the mode for carrying out this invention. The PC comprises a login transmission section 10 (or a serial number transmission section 11), a software designation section 12, an encrypted software receiving section 14, a received serial number decoding section 16, an encrypted serial number recording section 18, a serial number decoding section 20, a serial number verifying section 22, an encrypted software decoding section 24, and a software installing section 26.

The login transmission section 10 transmits a login ID and a password of a user of the PC 112 (or the measuring device 114). The user enters the ID and the password. Or the login transmission section 10 may be replaced with a serial number transmission section 11. The serial number transmission section 11 transmits the serial number of the PC 112 (or the measuring device 114). The user enters the serial number.

The software designation section 12 is provided so that the user designates the necessary one among downloadable software names presented by the distributing server 130. The login transmission section 10 (or the serial number transmission section 11) and the software designation section 12 may be configured with a universal browser working as a web client.

The encrypted software receiving section 14 receives the encrypted serial number or software transmitted by the distributing server 130. The received serial number decoding section 16 decodes the encrypted serial number transmitted from the distributing server 130. During the procedure, the distributing server 130 encrypts the serial number, using a public key method, wherein the serial number is used as a public key. The received serial number decoding section 16 decodes the serial number, which has been encrypted, using a secret key corresponding to said public key.

The encrypted serial number is recorded at the encrypted serial number recording section 18. The encryption method used here can be an arbitrary one. The serial number decoding section 20 decodes the encrypted serial number recorded at the encrypted serial number recording section 18. The serial number verifying section 22 verifies the serial number decoded at the receiving serial number decoding section 16, with the serial number decoded at the serial number decoding section 20. If disagreement is found as a result of verification, an error is displayed. If agreement is found, permission for decoding is given to the encrypted software decoding section 24 which is described later.

The encrypted software decoding section 24 decodes the encrypted software and the software installing section 26 installs the decoded software.

In FIG. 1, the received serial number decoding section 16 and the encrypted software decoding section 24 are separated. They can be integrated into one to decode encrypted software without inquiring into the result of verification at the serial number decoding section 20. In this case, the software installing section 26 installs decoded software if agreement is found as a result of verification.

The distributing server 130 comprises a login request receiving section 30, a serial number acquisition section 32, a software presenting section 34, a software selecting section 35, a software encrypting section 36, an encrypted software transmission section 38, a memory 40, and a software recording section 50.

The memory 40 comprises a user name database 42, a serial number database 44, a device information database 46, and a software database 48. Contents of each database are shown in FIG. 3. The user name database 42 records correspondence of the user ID and the user name as shown in FIG. 3 (a). The serial number database 44 records correspondence between the password and the user name as shown in FIG. 3 (b). Or, it records correspondence between the user ID and the user name. The device information database 46 records correspondence between the serial number and the device name as shown in FIG. 3 (c). The software database 48 records correspondence between the device name and the applicable software name, as shown in FIG. 3 (d).

The login request receiving section 30 receives the login ID and the password of the user transmitted from the login transmission section 10. The serial number acquisition section 32 reads the user name and the serial number from the user name database 42 and the serial number database 44, using the ID and the password received at the login request receiving section 30. However, if a serial number transmission section 11 is provided, the user name database 42 and the serial number database 44 are not used. The serial number acquisition section 32 further transmits the serial number.

The software presenting section 34 reads a corresponding device name from the device information database 46 after receiving the serial number. It reads the software name corresponding to the read device name, from the software database 48. The read software name is transmitted to the software designation section 12. The software selecting section 35 receives the software name designated at the software designation section 12. The software encrypting section 36 receives and encrypts the serial number transmitted from the serial number acquisition section 32. A public key method is used for encryption, wherein the serial number is used as a public key. The software encrypting section 36 reads software corresponding to the software name designated at the software designation section 12, from the software recording section 50. The software may be encrypted in the public key method, wherein the serial number is used as a public key. Or it may not be encrypted. The software may include the serial number. In this case, encryption of the software means encryption of the software and the serial number.

The encrypted software transmission section 38 transmits the encrypted serial number and the encrypted software, or the encrypted serial number and non-encrypted software, to the PC 112 (or the measuring device 114). The software recording section 50 records the software in correspondence with the software name.

Figure 4:
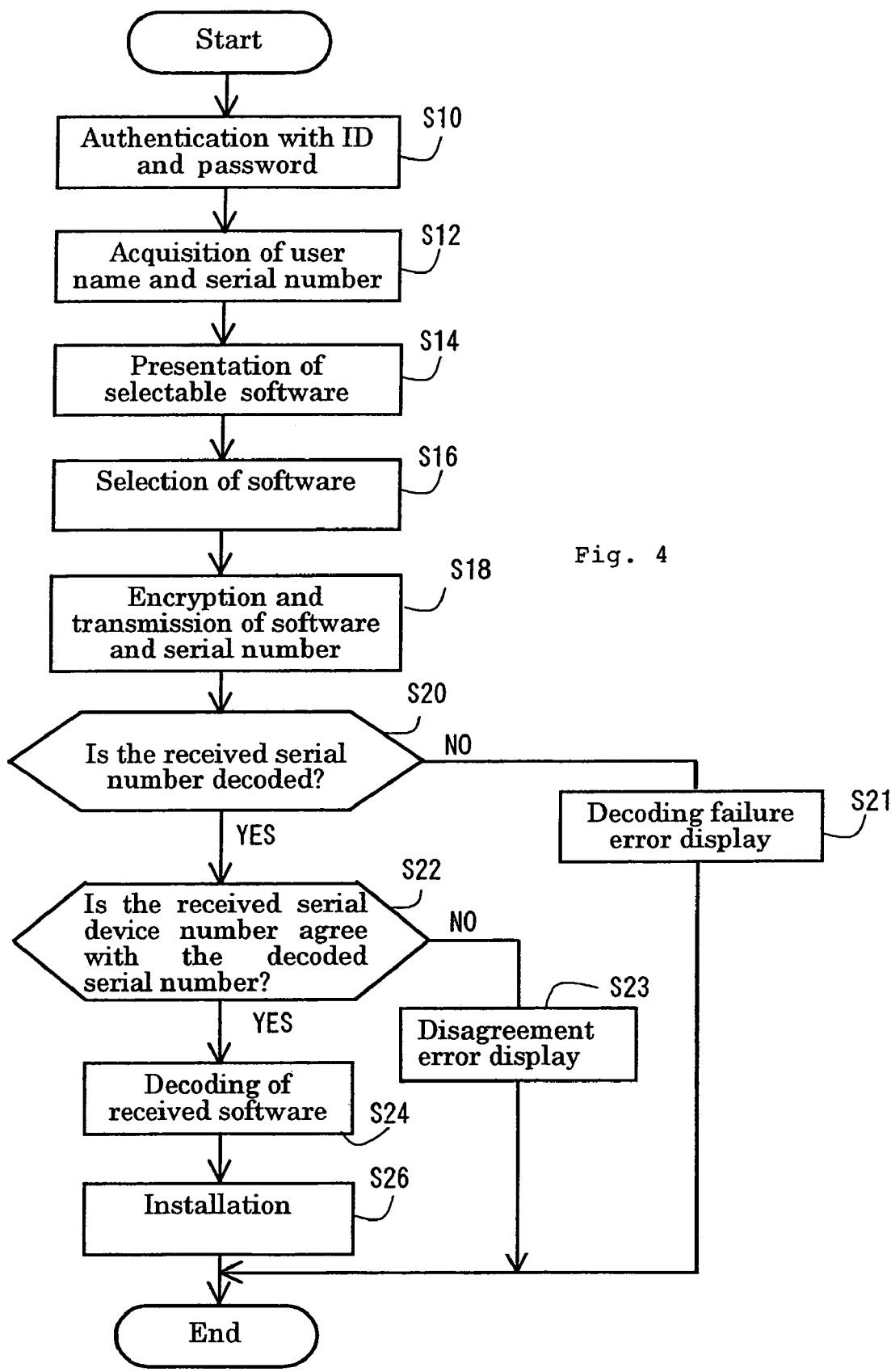
FIG. 4 is a flow chart showing the action of the best mode for carrying out this invention.

Next, operations of the best mode for carrying out this invention are described by using the flow chart shown in FIG. 4. First, the login transmission section 10 transmits an ID and password to the login request receiving section 30 after receiving the ID and the password entered by the user. The login request receiving section 30 authenticates the user (S10), using the ID and the password. The login request receiving section 30 may keep a file recording correspondence between the ID and the password. If correspondence between the ID and the password entered by the user is successful, authentication succeeds.

Next, the serial number acquisition section 32 acquires a user name from the user name database 42 according to the ID, and it acquires a serial number (S12) from the serial number database 44 from the password. Or, the serial number may be acquired according to the user name from the serial number database 44. The user name may be used for billing or for other purposes. The serial number becomes information for authenticating the PC 112 (or the measuring device 114).

Next, the software presenting section 34 acquires the serial number from the serial number acquisition section 32. And it acquires the device name from the device information database 46, using the serial number. Further, it acquires a software name suitable for the device, from the software database 48, using the device name. The acquired software name is transmitted to the software designation section 12 to present selectable software to the user (S14). The user designates the software name of the necessary software among the presented softwares, using the software designation section 12 (S16).

The software name designated at the software designation section 12 is transmitted to the software selecting section 35. The software selecting section 35 transfers the designated software name to the software encrypting section 36. The software encrypting section 36 reads a software corresponding to the software name, from the software recording section 50, using the received software name. Simultaneously, the software encrypting section 36 acquires the serial number from the serial number acquisition section 32. The software encrypting section 36 then encrypts the acquired software and the serial number (S18). Encryption is made in the public key method, and the serial number is used for the public key. However, the software may not be encrypted.

The encrypted software transmission section 38 transmits the encrypted software and the serial number to the encrypted software receiving section 14. The encrypted software receiving section 14 transmits the encrypted serial number to the received serial number decoding section 16. The received serial number decoding section 16 retains the secret key corresponding to the serial number which is the public key. Then the received serial number decoding section 16 decodes the encrypted serial number, using the secret key (S20).

If the decoding of the encrypted serial number fails (S20, No), a decoding failure error is displayed and the procedure is terminated (S21). If the correct serial number of the PC 112 (or the measuring device 114) is encrypted as a public key, decoding can be made. However, if the decoding of a serial number of another PC 112 or the like has been made, the secret key of the received serial number decoding section 16 does not correspond to the public key and decoding fails. Thus authentication of the PC 112 or the like can be made.

If the decoding of the encrypted serial number succeeds (S20, Yes), the serial number verifying section 22 verifies the serial number recorded inside the PC 112 or the like, with the decoded serial number (S22). The serial number recorded inside the PC 112 or the like is read in the following manner. The encrypted serial number recording section 18 records an encrypted serial number and the serial number decoding section 20 decodes the serial number. Then the serial number decoding section 20 verifies the decoded serial number with the serial number decoded at the received serial number decoding section 16. If disagreement is found as a result of verification (S22, No), a disagreement error is displayed (S23) and the procedure is terminated. Disagreement means use of an illegal serial number, and termination provides a means for avoiding use of the illegal serial number.

If agreement is found as a result of verification (S22, Yes), a permission for decoding the software is given by the serial number verifying section 22 to the encrypted software decoding section 24. Encrypted software must be transmitted in advance to the encrypted software decoding section 24 from the encrypted software receiving section 14. The encrypted software decoding section 24 decodes the encrypted software (S24) and the software installing section 26 installs this software to the PC 112 or the like (S26).

The encrypted software decoding section 24 may decode the software without the result of verification of the serial number verifying section 22, where a permission to install the software is issued if agreement is found as a result of verification. In this case, the software is decoded (S24) before verification (S22). If the serial number is written in the software, decoding of the serial number means decoding of the software. That is, the serial number is decoded when the software is decoded. Hence the encrypted software decoding section 24 decodes the software without relations to the result of verification at the serial number verifying section 22.

The aforementioned mode can be realized in the following method. A program for realizing each part of the above description recorded on a medium, is read at a media reader of a distributing server 130 or a PC 112 (or a measuring device 114), which is a computer comprising a CPU, a hard disk, and media (floppy disk, CD-ROM, etc.) readers, and the program is installed on the hard disk. The above function is realized in this method.

According to the best mode for carrying out this invention, the serial number is encrypted with the correct serial number being a public key, in only the following two cases: (1) the user gives a correct ID and password corresponding to the PC 112 (or the measuring device 114), to the login transmission section 10, and (2) the user gives a correct serial number corresponding to the PC 112 (or the measuring device 114), to the serial number transmission section 11. Hence the received serial number decoding section 16 succeeds to decode in either case (1) or case (2). Hence the correct serial number is acquired by the distributing server 130. This is because the purpose of software upgrading is not achieved even if the user enters a wrong serial number or the like. Hence authentication of the PC 112 or the like can be made.

As well, the software presenting section 34 acquires the device name from the serial number, and the name of the suitable software is acquired from the device name and presented to the user at the software designation section 12. Hence use of wrong upgrading software by the user is avoided. Further, the user can designate the necessary software at the software designation section 12, thereby selecting the exactly necessary software.

Further, encryption of software in the public key method blocks the software from inadvertent analyses. Moreover, because the internal serial number of the PC 112 or the like decoded by the serial number decoding section 20 is verified against the serial number decoded at the received serial number decoding section 16, the user refrains from using illegal serial numbers.

With this invention, an encrypting means encrypts the device number in the public key method with the device number inherent to the device being the public key, and a received device number decoding means decodes the device number, using a secret key corresponding to the public key. If the correct device number inherent to the device is given, decoding succeeds. On the other hand, if a wrong inherent device number is given, or the device number of another device is intentionally given, decoding fails. Hence decoding succeeds only if the correct device number is given. Therefore the accurate device number inherent to the device can be acquired and device authentication can be made.

What is claimed is:

1. A device authentication unit for authenticating a device having an inherent device number comprising:
   a received device number decoding means for receiving an encrypted said device number, which is encrypted using a public key with said device number being the public key, and decoding an encrypted device number using the secret key corresponding to said device number, which is said public key.

2. A device authentication unit for authenticating a device having an inherent device number comprising:
   an encrypting means for receiving said device number and encrypting the received said device number; and
   an encrypted data transmission means for transmitting the encrypted said device number, wherein the received device number is encrypted using a public key, said device number being the public key.

3. A device authentication unit for authenticating a device having an inherent device number comprising:
   an encrypting means for receiving said device number and encrypts the received said device number;
   an encrypted data transmission means for transmitting said encrypted device number; and
   a received device number decoding means for receiving said encrypted device number and decoding said encrypted device number by using a secret key corresponding to said device number,
   wherein the received device number is encrypted using a public key, said device number being the public key.

4. A device authentication unit described in claim 1, which displays an error if said received device number decoding means cannot decode the encrypted said device number.

5. A device authentication unit described in claim 1, comprising:
   a corresponding software recording means for recording correspondence between said device number and a name of a software suitable for said device; and
   a software recording means for recording software corresponding to said software name; wherein
   said encrypting means reads said software corresponding said software name from said software recording means, and encrypts said software with said device number being a public key; and
   said encrypted data transmission means transmits the encrypted said device number and the encrypted said software.

6. A device authentication unit described in claim 1, comprising:
   a correspondence software recording means for recording correspondence between said device number and a name of a software suitable for said device;
   a software presenting means for reading and presenting the name of the software suitable for said device from said correspondence software recording means, using the received said device number;
   a software designation means for accepting a designation of said software necessary for said device from among said software;
   a software selecting means for transmitting said software name to said encrypting means upon said designation; and
   a software recording means for recording software corresponding to said software name; wherein
   said encrypting means reads said software corresponding to said software name designated with said software recording means; and
   said encrypted data transmission means transmits the encrypted said device number and the read said software.

7. A device authentication unit described in claim 1, comprising:
   a correspondence software recording means for recording correspondence between said device number and a name of a software suitable for said device;
   a software presenting means for reading and presenting the name of the software suitable for said device from said correspondence software recording means, using the received said device number;
   a software designation means for accepting a designation of said software necessary for said device, from the presented said software;
   a software selecting means for sending said software name to said encrypting means upon said designation; and
   a software recording means for recording the software corresponding to said software name; wherein said encrypting means reads said software which corresponds to said software designated by said software recording means, and encrypts said software in the public key method with said device number being a public key; and
   said encrypted data transmission means transmits the encrypted said device number and the encrypted said software.

8. A device authentication unit described in claim 1, comprising:
   a login request receiving means for receiving and verifying a user ID and a password;
   a device number database, which records correspondence between said password and said device number; and
   a device number acquisition means for acquiring and transmitting said device number from said device number database upon agreement of the result of verification by said login request receiving means, using said password.

9. A device authentication unit described in claim 1, comprising:
   a login request receiving means for receiving and verifying a user ID and a password;
   a device number database, which records correspondence between said ID and said device number; and
   a device number acquisition means for acquiring and transmitting from said device number database upon agreement of the result of verification by said login request receiving means, using said ID.

10. A device authentication unit described in claim 1, comprising:
- a corresponding software recording means for recording correspondence between said device number and a name of a software suitable for said device; and
- a software recording means for recording software corresponding to said software name;
- wherein said encrypting means reads said software corresponding to said software name, from said software recording means; and
- said encrypted data transmission means transmits the encrypted said device number and the read said software.

11. A device authentication unit described in claim 10, wherein said correspondence software recording means comprises:
- a device information database which records correspondence between said device number and a device name of said device; and
- a software database which records the device name of said device and the name of the software suitable for said device.

12. A device authentication unit described in claim 1, comprising:
- a device number recording means for recording said device number; and
- a device number verifying means for verifying said device number decoded by said received device number decoding means with said device number recorded by said device number recording means.

13. A device authentication unit described in claim 12, wherein said device number recording means comprises:
- an encrypted device number recording means for recording the encrypted said device number; and
- a device number decoding means for decoding the encrypted said device number.

14. A device authentication unit described in claim 12, which displays an error if verification by said device number verifying means results in disagreement.

15. A device authentication method for authenticating a device having an inherent device number comprising:
- an encrypting step for receiving said device number and encrypting the received said device number; and
- an encrypted data transmission step for transmitting the encrypted said device number, wherein the received device number is encrypted using a public key, said device number being the public key.

16. A device authentication method for authenticating a device having an inherent device number comprising:
- a received device number decoding step for receiving the encrypted said device number using the public key with said device number being the public key, and decoding an encrypted said device number using the secret key corresponding to said device number, which is said public key.

17. A computer-readable medium having a program of instructions for execution by the computer to perform a device authentication processing for authenticating a device having an inherent device number, said device authentication processing comprising:
- an encrypting processing for receiving said device number and encrypting the received said device number; and
- an encrypted data transmission processing for transmitting the encrypted said device number, wherein the received device number is encrypted using a public key, said device number being the public key.

18. A computer-readable medium having a program of instructions for execution by the computer to perform a device authentication processing for authenticating a device having an inherent device number, said device authentication processing comprising:
- a received device number decoding processing for receiving the encrypted said device number using the public key with said device number being the public key, and decoding an encrypted said device number using the secret key corresponding to said device number, which is said public key.

19. A device authentication apparatus for authenticating a device having an inherent device number comprising:
- a received device number decoding unit that receives an encrypted said device number, which is encrypted using a public key with said device number being the public key, and decodes an encrypted said device number using the secret key corresponding to said device number, which is said public key.

20. A device authentication apparatus for authenticating a device having an inherent device number comprising:
- an encrypting unit that receives said device number and encrypts the received said device number; and
- an encrypted data transmission unit that transmits the encrypted said device number, wherein the received device number is encrypted using a public key, said device number being the public key.

21. A device authentication apparatus for authenticating a device having an inherent device number comprising:
- an encrypting unit that receives said device number and encrypts the received said device number;
- an encrypted data transmission unit that transmits said encrypted device number; and
- a received device number decoding unit that receives said encrypted device number and decodes said encrypted device number by using a secret key corresponding to said device number,
- wherein the received device number is encrypted using a public key, said device number being the public key.

22. A device authentication apparatus described in claim 21, which displays an error if said received device number decoding unit cannot decode the encrypted said device number.

23. A device authentication apparatus described in claim 21, comprising:
- a corresponding software recording unit that records correspondence between said device number and a name of a software suitable for said device; and
- a software recording unit that records software corresponding to said software name; wherein
- said encrypting unit reads said software corresponding said software name from said software recording unit, and encrypts said software with said device number being a public key; and
- said encrypted data transmission unit transmits the encrypted said device number and the encrypted said software.

24. A device authentication apparatus described in claim 21, comprising:
- a correspondence software recording unit that records correspondence between said device number and a name of a software suitable for said device;
- a software presenting unit that reads and presents the name of the software suitable for said device from said correspondence software recording unit, using the received said device number;

a software designation unit that accepts a designation of said software necessary for said device from among said software;

a software selecting unit that transmits said software name to said encrypting unit upon said designation; and a software recording unit that records software corresponding to said software name; wherein said encrypting unit reads said software corresponding to said software name designated with said software recording unit; and said encrypted data transmission unit transmits the encrypted said device number and the read said software.

25. A device authentication apparatus described in claim 21, comprising:

a correspondence software recording unit that records correspondence between said device number and a name of a software suitable for said device;

a software presenting unit that reads and presents the name of the software suitable for said device from said correspondence software recording unit, using the received said device number;

a software designation unit that accepts a designation of said software necessary for said device, from the presented said software;

a software selecting unit that sends said software name to said encrypting unit upon said designation; and a software recording unit that records the software corresponding to said software name; wherein said encrypting unit reads said software which corresponds to said software designated by said software recording unit, and encrypts said software in the public key method with said device number being a public key; and said encrypted data transmission unit transmits the encrypted said device number and the encrypted said software.

26. A device authentication unit apparatus described in claim 21, comprising:

a login request receiving unit that receives and verifies a user ID and a password;

a device number database, which records correspondence between said password and said device number; and a device number acquisition unit that acquires and transmits said device number from said device number database upon agreement of the result of verification by said login request receiving unit, using said password.

27. A device authentication apparatus described in claim 21, comprising:

a login request receiving unit that receives and verifies a user ID and a password;

a device number database, which records correspondence between said ID and said device number; and a device number acquisition unit that acquires and transmits from said device number database upon agreement of the result of verification by said login request receiving unit, using said ID.

28. A device authentication apparatus described in claim 21, comprising:

a corresponding software recording unit that records correspondence between said device number and a name of a software suitable for said device; and a software recording unit that records software corresponding to said software name; wherein said encrypting unit reads said software corresponding to said software name, from said software recording unit; and said encrypted data transmission unit transmits the encrypted said device number and the read said software.

29. A device authentication apparatus described in claim 28, wherein said correspondence software recording unit comprises:

a device information database which records correspondence between said device number and a device name of said device; and a software database which records the device name of said device and the name of the software suitable for said device.

30. A device authentication apparatus described in claim 21, comprising:

a device number recording unit that records said device number; and a device number verifying unit that verifies said device number decoded by said received device number decoding unit with said device number recorded by said device number recording unit.

31. A device authentication apparatus described in claim 30, wherein said device number recording unit comprises:

an encrypted device number recording unit that records the encrypted said device number; and a device number decoding unit that decodes the encrypted said device number.

32. A device authentication apparatus described in claim 30, which displays an error if verification by said device number verifying unit results in disagreement.

* * * * *

UNITED STATES PATENT AND TRADEMARK OFFICE
CERTIFICATE OF CORRECTION

PATENT NO. : 7,356,698 B2  Page 1 of 1
APPLICATION NO. : 10/181372
DATED : April 8, 2008
INVENTOR(S) : N. Arakawa et al.

It is certified that error appears in the above-identified patent and that said Letters Patent is hereby corrected as shown below:

At column 11, line 1, "claim 1" should be --claim 3--.

At column 9, line 51, "claim 1" should be --claim 3--.

At column 9, line 65, "claim 1" should be --claim 3--.

At column 10, line 22, "claim 1" should be --claim 3--.

At column 10, line 47, "claim 1" should be --claim 3--.

At column 10, line 58, "claim 1" should be --claim 3--.

Signed and Sealed this

Eighteenth Day of August, 2009

David J. Kappos
*Director of the United States Patent and Trademark Office*